United States Patent
Joshi et al.

(10) Patent No.: US 10,535,156 B2
(45) Date of Patent: Jan. 14, 2020

(54) SCENE RECONSTRUCTION FROM BURSTS OF IMAGE DATA

(71) Applicant: Microsoft Technology Licensing, LLC, Redmond, WA (US)

(72) Inventors: Neel Suresh Joshi, Seattle, WA (US); Sudipta Narayan Sinha, Redmond, WA (US); Minh Phuoc Vo, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/478,688

(22) Filed: Apr. 4, 2017

(65) Prior Publication Data

US 2018/0225836 A1    Aug. 9, 2018

Related U.S. Application Data

(60) Provisional application No. 62/454,559, filed on Feb. 3, 2017.

(51) Int. Cl.
*G06T 7/73* (2017.01)
*G06T 7/55* (2017.01)

(52) U.S. Cl.
CPC .............. *G06T 7/73* (2017.01); *G06T 7/55* (2017.01); *G06T 2200/08* (2013.01); *G06T 2207/30244* (2013.01)

(58) Field of Classification Search
None
See application file for complete search history.

(56) References Cited

U.S. PATENT DOCUMENTS 6,476,803 B1 * 11/2002 Zhang ................... G06T 15/00
                                                       345/419
9,171,403 B2    10/2015 Shapira et al.
(Continued)

FOREIGN PATENT DOCUMENTS

WO    2013/039470 A1    3/2013
WO    2013197157 A1     3/2015

OTHER PUBLICATIONS

Furukawa, Yasutaka, et al. "Towards internet-scale multi-view stereo." Computer Vision and Pattern Recognition (CVPR), 2010 IEEE Conference on. IEEE, 2010. (Year: 2010).*

(Continued)

*Primary Examiner* — Justin P. Misleh

(57) ABSTRACT

Examples of the present disclosure describe systems and methods for scene reconstruction from bursts of image data. In an example, an image capture device may gather information from multiple positions within the scene. At each position, a burst of image data may be captured, such that other images within the burst may be used to identify common image features, anchor points, and geometry, in order to generate a scene reconstruction as observed from the position. Thus, as a result of capturing bursts from multiple positions in a scene, multiple burst reconstructions may be generated. Each burst may be oriented within the scene by identifying a key frame for each burst and using common image features and anchor points among the key frames to determine a camera position for each key frame. The burst reconstructions may then be combined into a unified reconstruction, thereby generating a high-quality reconstruction of the scene.

20 Claims, 9 Drawing Sheets

(56) References Cited

U.S. PATENT DOCUMENTS

| | | | |
|---|---|---|---|
| 9,208,612 | B2 | 12/2015 | Frahm et al. |
| 9,242,171 | B2 | 1/2016 | Newcombe et al. |
| 9,432,636 | B2 | 8/2016 | Gourlay et al. |
| 9,445,081 | B1 | 9/2016 | Kouperman et al. |
| 9,483,703 | B2 | 11/2016 | Medioni et al. |
| 2004/0258309 | A1* | 12/2004 | Keaton ............... G06K 9/00201 382/190 |
| 2007/0182861 | A1* | 8/2007 | Luo ......................... G11B 27/28 348/700 |
| 2008/0181486 | A1* | 7/2008 | Spooner ..................... G06T 7/55 382/154 |
| 2012/0194644 | A1* | 8/2012 | Newcombe ............... G06T 7/74 348/46 |
| 2013/0215221 | A1* | 8/2013 | Wang ......................... G06T 7/73 348/43 |
| 2015/0139608 | A1 | 5/2015 | Theobalt et al. |
| 2018/0160102 | A1* | 6/2018 | Luo ..................... H04N 13/271 |

OTHER PUBLICATIONS

Knoblauch, et al., "Non-Parametric Sequential Frame Decimation for Scene Reconstruction in Low-Memory Streaming Environments", In Journal of International Symposium on Visual Computing, Sep. 26, 2011, 12 pages.

Knorr, et al., "A Geometric Segmentation Approach for the 3d Reconstruction Of Dynamic Scenes in 2d Video Sequences", In Proceedings of 14th European Signal Processing Conference, Sep. 4, 2006, 5 pages.

Kannan, et al., "A Versatile Algorithm for Reconstruction of Sports Video Sequences", In of IEEE International Conference on Computational Intelligence and Computing Research, Dec. 28, 2010, 5 pages.

Cornelis, et al., "3D Urban Scene Modeling Integrating Recognition and Reconstruction", In International Journal of Computer Vision, Jul. 1, 2008, pp. 1-18.

Pollefeys, et al., "Detailed Real-Time Urban 3D Reconstruction From Video", In International Journal of Computer Vision, vol. 78, Jul. 1, 2008, pp. 1-43.

Kang, et al., "Fast dense 3D reconstruction using an adaptive multiscale discrete-continuous variational method", In Journal of IEEE Winter Conference on Applications of Computer Vision, Mar. 24, 2014, pp. 1-8.

Keller, et al., "Real-time 3D Reconstruction in Dynamic Scenes using Point-based Fusion", In Journal of International Conference on 3D Vision—3DV, Jun. 29, 2013, pp. 1-8.

Ahmed, et al., "Robust Key Frame Extraction for 3D Reconstruction From Video Streams", In International Conference on Computer Vision Theory and Applications, Jan. 31, 2010, 8 Pages.

"International Search Report and Written Opinion Issued in PCT Application No. PCT/US2018/015805", dated May 7, 2018, 13 Pages.

Repko, et al., "3D Models from Extended Uncalibrated Video Sequences: Addressing Key-Frame Selection and Projective Drift", In IEEE Fifth International Conference on 3-D Digital Imaging and Modelling, Jun. 13, 2005, 8 Pages.

Samuel, et al., "Burst Photography for High Dynamic Range and Low-Light Imaging on Mobile Cameras", In ACM Transactions on Graphics, vol. 35, Issue 6, Nov. 11, 2006, 12 Pages.

\* cited by examiner

SCENE RECONSTRUCTION FROM BURSTS OF IMAGE DATA

CROSS-REFERENCE TO RELATED APPLICATION

This application claims priority to U.S. Provisional Application No. 62/454,559, entitled "Scene Reconstruction from Bursts of Image Data," filed on Feb. 3, 2017, the entire disclosure of which is hereby incorporated by reference in its entirety.

BACKGROUND

A scene may be reconstructed using image data captured by an image capture device at various positions within the scene. The image capture device may be positioned throughout the scene in order to capture the scene from many diverse perspectives and vantage points. Ideally, the scene would be observed from all possible angles in order to generate the best-possible recreation, but doing so is time-consuming and resource-intensive. Conversely, capturing data from too few positions creates difficulties when reconstructing the scene, as it becomes difficult to identify image features and anchor points between multiple images if the image data captured at various positions lacks commonality.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for scene reconstruction from bursts of image data. As an example, an image capture device may be used to gather information about a scene. Information may be gathered from multiple positions within the scene, thereby providing a diverse dataset from which a reconstruction may be generated. At each position, a burst of image data may be captured that may later be used to generate a scene reconstruction for the burst. By capturing a burst of image data for a given position, other images within the burst may be used to identify common image features, anchor points, and geometry, such that a reconstruction may be generated for the scene as observed from the position.

Thus, as a result of capturing bursts of image data from multiple positions, multiple reconstructions may be generated for the scene. Each burst of image data may be oriented within the scene in relation to other bursts by identifying a key frame for each burst and using common image features and anchor points among the key frames to determine an image capture device position for each key frame. These image capture device positions may be used to orient each of the bursts and associated reconstructions. The reconstructions may then be combined into a unified reconstruction, thereby generating a high-quality reconstruction of the scene without engaging in time-consuming and data-intensive image capture techniques that were previously required to achieve such a result.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
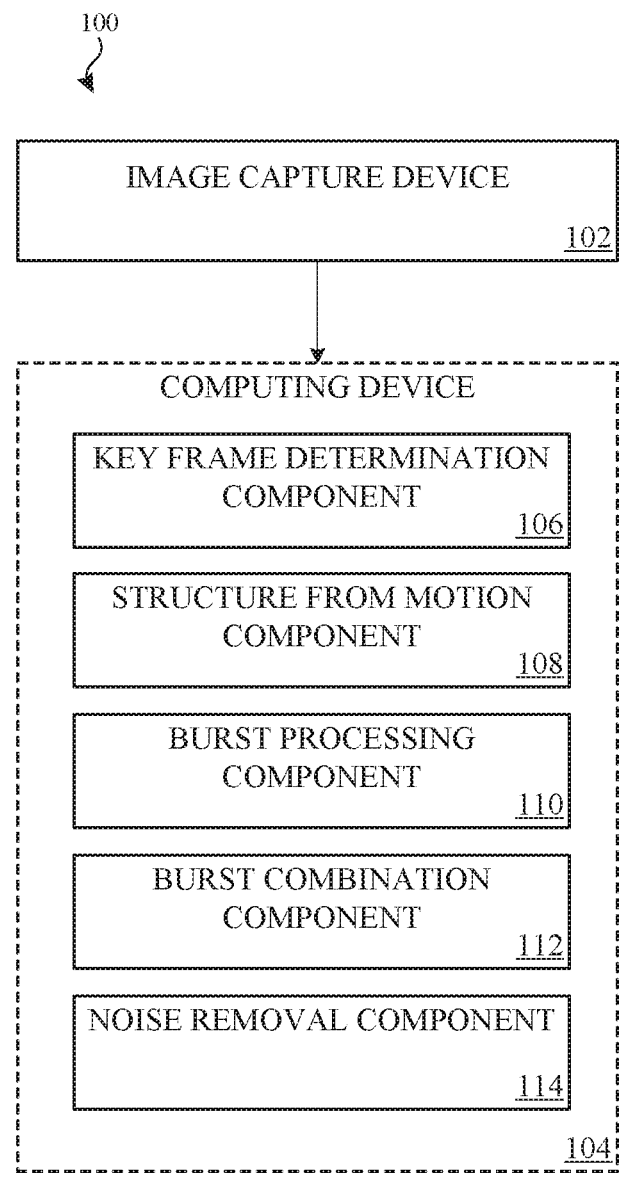
FIG. 1 illustrates an example system for generating a scene reconstruction from bursts of image data captured by an image capture device.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure generally relates to performing three-dimensional scene reconstruction using bursts of image data. Information relating to the scene may be captured using an image capture device from multiple positions within the scene. In an example, an image capture device may be a still camera (e.g., a digital camera, a film camera, a mobile device camera, etc.), a video camera (e.g., a digital video camera, an analog video camera, a web camera, etc.), or any other image capture device. In some examples, the image capture device may be a drone, UAV, or another manually- or automatically-positioned camera. In another example, multiple image capture devices may be used to capture information relating to the scene. The collected information may be used to generate a reconstruction of the scene, perform measurements or calculations, among other uses.

A three-dimensional scene may be a landmark, building, historical monument, or natural attraction, among others. In an example, a scene may be the interior of a structure (e.g., a room, an office, a mall or other retail space, a vehicle, etc.), the exterior of a structure (e.g., a building, a patio or balcony, etc.), or any combination thereof. As will be appreciated, any type of scene may be reconstructed using aspects disclosed herein without departing from the spirit of this disclosure.

In order to generate a reconstruction for a scene, the scene may be observed by an image capture device from a variety of poses and orientations. As an example, the poses may be positioned around or within the scene such that the scene is observed from varying perspectives. When capturing information from a given pose and orientation, a burst of image data may be captured while varying the position of the image capture device. This may cause frames of the burst of image data to exhibit variations in relation to each other, which may be later analyzed when determining scene geometry. For example, the distance between an image capture device and an object may change, thereby enabling depth information to be determined when comparing the frames that were captured from different locations. In another example, a burst of image data may be comprised of multiple images, image parts, a stream of video data frames, or a combination thereof, among other data. The image capture device may capture additional information, including, but not limited to, accelerometer data, GPS data, compass data, information relating to the captured data (e.g., brightness, shutter speed, aperture, etc.), or hardware or software information. The resulting bursts of image data from multiple image capture device positions within the scene may then be analyzed according to aspects disclosed herein in order to generate a reconstruction of the scene.

FIG. 1 illustrates an example system 100 for generating a scene reconstruction from bursts of image data captured by an image capture device. Example system 100 comprises image capture device 102 and computing device 104. Image capture device 102 may be a still camera, a video camera, or any other image capture device. In some examples, image capture device 102 may be positioned or controlled manually or automatically. While only one image capture device is shown in FIG. 1, it will be appreciated that multiple image capture devices may be used to capture information relating to the three-dimensional scene without departing from the spirit of this disclosure.

Computing device 104 is comprised of key frame determination component 106, structure from motion component 108, burst processing component 110, burst combination component 112, and noise removal component 114. Computing device 104 may be a personal computing device, tablet computing device, mobile computing device, or distributed computing device, among others. While computing device 104 is illustrated as separate from image capture device 102, image capture device 102 may comprise computing device 104 and one or more of components 106-114. In another example, image capture device 102 may comprise one or more or components 106-114, while computing device 104 comprises one or more of the other components. In another example, computing device 104 may be a distributed computing device such that multiple computing devices are used to perform the functions of components 106-114. Additionally, components 106-114 may be hardware components, software components, or some combination thereof.

Image capture device 102 may provide information relating to a scene to computing device 104. As discussed above, the information may comprise image, video, or other data captured by image capture device 102 from various poses and orientations within the scene. When evaluating information received from image capture device 102, computing device 104 may use one or more of components 106-114. As an example, key frame determination component 106 may be used to determine a key frame among the frames of each burst of image data received from image capture device 102. A key frame may be determined based on characteristics of a frame, or based on information associated with the frame, among other attributes. In an example, accelerometer, shutter speed, or positioning data, among others, may be evaluated to select a key frame from the multiple frames of data for a given burst of image data. In another example, the key frame may be randomly selected. As will be appreciated, other selection techniques may be used without departing from the spirit of this disclosure. Key frame determination component 106 may be used to select a key frame for each burst of image data captured from the variety of positions within the scene.

In an example, structure from motion component 108 may be used to analyze key frames (e.g., the key frames that were determined by key frame determination component 106). Structure from motion component 108 may perform image feature detection within the key frames (e.g., using a variety of algorithms such as scale-invariant feature transform (SIFT) or speeded up robust features (SURF), among others). The detected image features may be compared or matched among key frames, such that the anchor points associated with the identified features within the scene may be determined. Structure from motion component 108 may use the identified anchor points to determine the pose and orientation of the image capture device for each key frame, such that each key frame's image capture device position is determined in relation to the image capture device positions for the other key frames. In some examples, structure from motion component 108 may also generate a rough reconstruction of the scene based on the key frames, the detected image features and anchor points, and the determined poses and orientations of the image capture device at each key frame, or any combination thereof. In some examples, structure from motion component 108 may use additional information captured by image capture device 102, including, but not limited to, accelerometer data or metadata relating to the captured information (e.g., aperture, shutter speed, etc.).

Burst processing component 110 may process a burst of image data based on a key frame associated with the burst of image data. In an example, burst processing component 110 may use a key frame determined by key frame determination component 106 and/or data generated by structure from motion component 108. In some examples, each frame of the burst of image data may be analyzed in relation to the key frame associated with the burst of image data, such that anchor points may be identified within the other frames based on the image features and/or anchor points in the key frame. Similarly, an image capture device pose and orientation may be determined for the other frames in the burst of image data based on the image capture device position of the key frame, anchor points in the key frame and in other frames, or any combination thereof. Burst processing component 110 may then use this information to generate a reconstruction of the scene based on the burst of image data. Burst processing component 110 may apply the structure from motion techniques described above.

In some examples, burst processing component 110 may process one or more of the bursts of image data relating to the scene (e.g., which may have been received from image capture device 102), thereby generating a scene reconstruction for each of the processed bursts of image data. Burst combination component 112 may then generate a unified reconstruction of the scene based on the generated scene reconstructions. Burst combination component 112 may combine the scene reconstructions using at least one of a variety of techniques, including, but not limited to, comparing anchor points within the burst reconstructions, comparing geometry information (e.g., depth information, image features, etc.) within the burst reconstructions, evaluating image capture device positions associated with the burst reconstructions (e.g., an image capture device position of a frame of image data, of a key frame, etc.), or evaluating confidence level information (e.g., based on color-matching, image-consistency metrics, etc.). As a result, burst combination component 112 may generate a unified reconstruction by projecting the individual reconstructions onto each other.

Noise removal component 114 may be used to remove noise from a reconstruction (e.g., a reconstruction based on a burst of image data as generated by burst processing component 110, a unified reconstruction based on a plurality of reconstructions as generated by burst combination component 112, etc.). Noise may be removed from a reconstruction by evaluating characteristics of the reconstruction (e.g., either individually within the reconstruction, in relation to other reconstructions, or a combination thereof), characteristics of one or more frames from a burst of image data associated with the reconstruction, or other related information (e.g., a confidence score associated with the reconstruction, geometric information, lighting information, hardware or software information, etc.), among others. A variety of algorithms may be used, such as a geometric or arithmetic mean or median filter, among others. As will be appreciated, noise removal component 114 may apply any noise removal technique without departing from the spirit of this disclosure.

Figure 2:
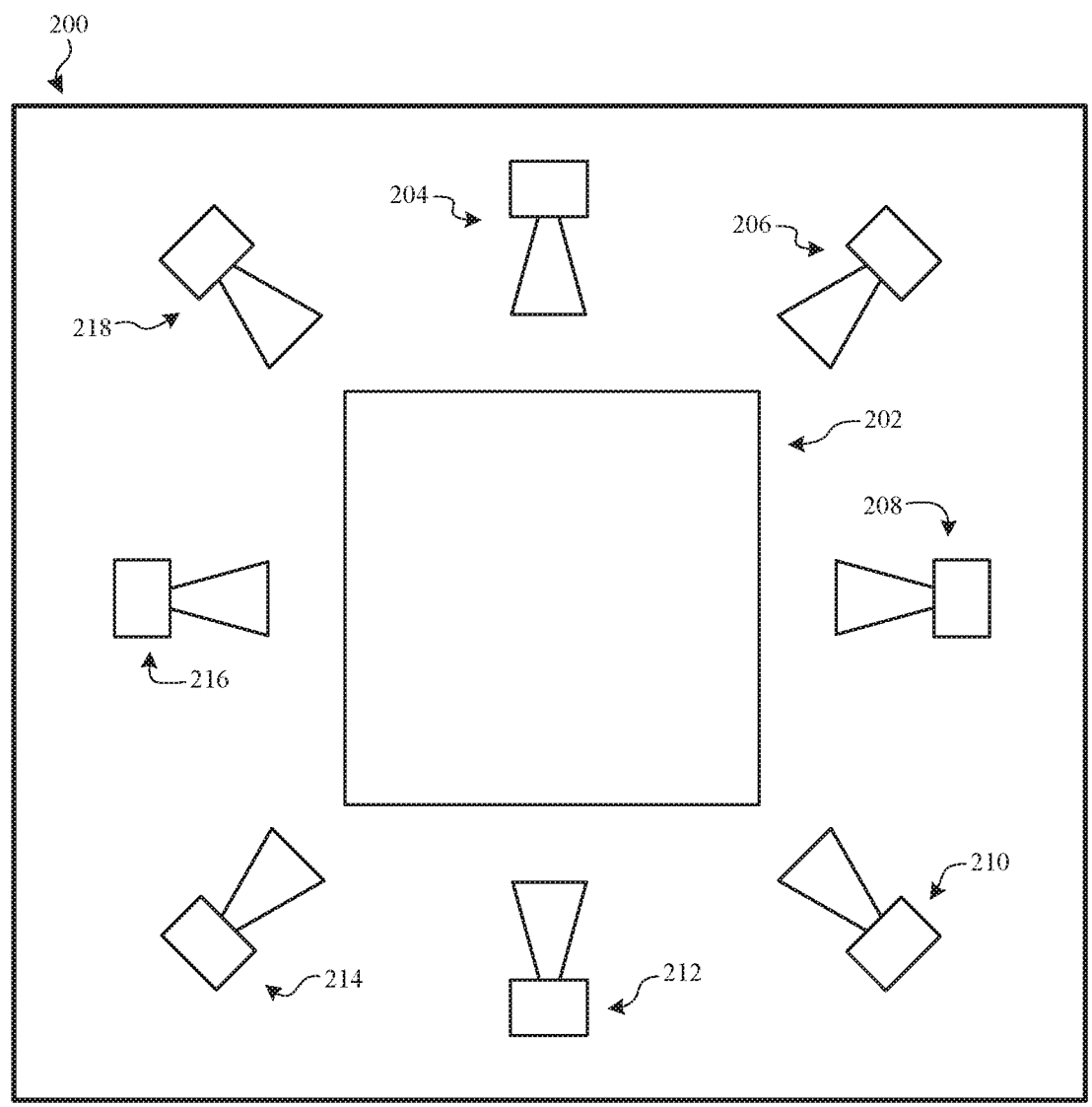
FIG. 2 illustrates a top-down view of an example scene for which a reconstruction using bursts of image data may be generated.

FIG. 2 illustrates a top-down view of an example scene 200 for which a reconstruction using a burst of image data may be generated. Scene 200 is comprised of object 202 and image capture device positions 204-218. As discussed above, object 202 may be an interior object, an exterior object, or a combination thereof. While object 202 is illustrated as a cube, object 202 may have a variety of dimensions, shapes, or other attributes or characteristics. Similarly, even though scene 200 is depicted as containing one such object, it will be appreciated that a scene may contain multiple objects having similar or different characteristics, or, in some examples, a scene may contain no objects. In order to recreate scene 200 comprising object 202, an image capture device may observe object 202 from image capture device positions 204-218. While eight image capture device positions are shown in example scene 200, it will be appreciated that a greater or fewer number of image capture device positions may be used to capture information relating to scene 200.

Image capture device positions 204-218 may be randomly or systematically positioned within scene 200. In an example, image capture device positions 204-218 may be evenly distributed around object 202, positioned based on specific characteristics of object 202, or determined based on certain coverage objectives, among other considerations. Image capture device positions 204-218 may have a specific pose and orientation within scene 200, such that object 202 may be observed from a variety of perspectives. In an example, image capture device positions 204-218 may be positioned at similar or different heights as compared to one another. In another example, the distances between object 202 and image capture device positions 204-218 may be similar or different. As will be appreciated, image capture device positions 204-218 may have a variety of similar or different positions or attributes.

Bursts of image data may be captured using an image capture device (e.g., image capture device 102 in FIG. 1), by positioning the image capture device at image capture device positions 204-218. In some examples, image capture device positions 204-218 need not be stationary, such that an image capture device may be used to capture bursts of image data as the image capture device is moving around object 202 or within scene 200. In an example, multiple image capture devices may be used to capture the bursts of image data. Once bursts of image data are captured from each of image capture device positions 204-218, the bursts of image data may be processed according to aspects disclosed herein in order to generate a reconstruction of the scene (e.g., using components 106-114 of computing device 104 in FIG. 1).

Figure 3:
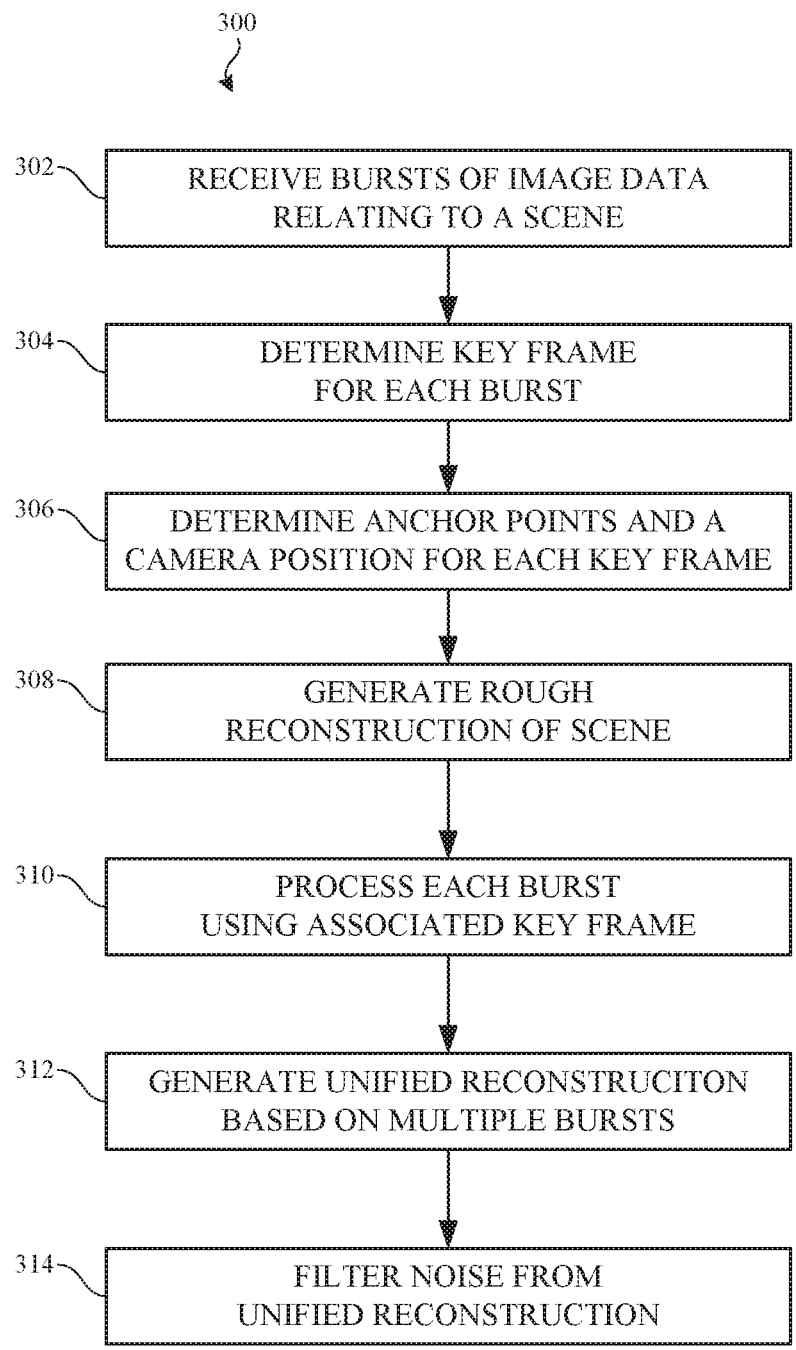
FIG. 3 illustrates an example method for generating a scene reconstruction from bursts of image data received from an image capture device.

FIG. 3 illustrates an example method 300 for generating a scene reconstruction from bursts of image data received from an image capture device. Method 300 may be performed by a computing device such as computing device 104 in FIG. 1. Method 300 begins at operation 302, where bursts of image data relating to a scene may be received. The bursts of image data may be received from an image capture device, such as image capture device 102 in FIG. 1. In one example, the bursts of image data may comprise data captured by an image capture device from multiple poses and orientations within a scene, such as one or more of image capture device positions 204-218 in FIG. 2. As discussed above, the received bursts of image data may comprise image data, video data, positional data, and/or other information.

Moving to operation 304, a key frame may be determined for each burst of image data. In an example, key frames may be determined using key frame determination component 106 in FIG. 1. As discussed above, a key frame may be determined for each of the bursts of image data based on characteristics of frames within a burst of image data (e.g., by evaluating image data, metadata, or other information to determine whether the frame is blurry, well-lit, etc.), based on additional information gathered by the image capture device when capturing the burst of image data, or other attributes. In another example, a key frame for a burst of image data may be randomly selected from other frames within the burst of image data. For example, if a burst of image data contained ten captured frames, one of the frames would be marked or otherwise indicated as a key frame.

In some aspects, the key frame may be selected based on properties of the key frame when compared with the other frames in the burst of image data. For example, one frame may be selected over the other frames in the burst of image data due to the selected frame being less blurry than the other frames.

At operation 306, an image capture device position may be determined for each of the key frames that were determined in operation 304. In an example, image capture device positions may be determined using structure from motion component 108 in FIG. 1. Determining an image capture device position for a key frame may comprise performing image feature detection within the key frames in order to identify anchor points among the key frames. As a result, anchor points that exist in multiple key frames may be identified and used to determine the image capture device position (e.g., its pose and orientation) from which each key frame was captured. Once this information is determined, flow progresses to operation 308, where a rough reconstruction of the scene may be generated. The rough reconstruction may be generated using structure from motion component 108 in FIG. 1. The reconstruction may be generated based on the key frames that were selected from each of the bursts of image data, the detected image features and anchor points, and the determined poses and orientations of the image capture device for each of the key frames, or any combination thereof. In some examples, additional information may be used, including, but not limited to, accelerometer data or metadata relating to the captured information (e.g., aperture, shutter speed, etc.).

Moving to operation 310, each burst of image data may be processed using the key frame associated with the burst of image data. In an example, bursts of image data may be processed using burst processing component 110 in FIG. 1. In some examples, a burst of image data may be processed by performing the steps of method 400 in FIG. 4, which is discussed below in greater detail. Frames of a burst of image data may be analyzed in relation to the key frame associated with the burst of image data, such that anchor points may be identified within the other frames of the burst of image data based on the image features and/or anchor points in the key frame. Similarly, an image capture device pose and orientation may be determined for the other frames in the burst of image data based on the image capture device position of the key frame, anchor points in the key frame and in other frames, or any combination thereof. A reconstruction of the scene may be generated based on a variety of information, including, but not limited to, the burst of image data, the anchor points, and the image capture device position, or any combination thereof. As discussed above, structure from motion techniques may be applied to the frames of the burst of image data in order to generate a reconstruction for the burst of image data.

At operation 312, a unified reconstruction may be generated from the reconstructions that were generated for each of the bursts of image data. The unified reconstruction may be generated using burst combination component 112 in FIG. 1. The unified reconstruction may be generated using at least one of a variety of techniques, including, but not limited to, comparing anchor points within the burst reconstructions, comparing geometry information (e.g., depth information, image features, etc.) within the burst reconstructions, evaluating image capture device positions associated with the burst reconstructions (e.g., an image capture device position of a frame of image data, of a key frame, etc.), or evaluating confidence level information (e.g., based on color-matching, image-consistency metrics, etc.).

As an example, such features (e.g., anchor points, geometry information, and/or image capture device positions, among others) may be evaluated when projecting image features and related structures of each reconstruction into the unified reconstruction, such that the features of each reconstruction match with those of other reconstructions and, ultimately, with the unified reconstruction. In another example, confidence level information may be evaluated when combining reconstructions in order to resolve discrepancies (e.g., between reconstructions as a whole, between subparts of reconstructions such as image features or anchor points, etc.). As a result, certain aspects of one reconstruction may be favored over aspects of another when generating the unified reconstruction.

Moving to operation 314, noise may be filtered from the unified reconstruction. In an example, noise may be filtered using noise removal component 114 in FIG. 1. As discussed above, noise may be removed from a reconstruction by evaluating characteristics of the reconstruction, characteristics of one or more frames from a burst of image data, or other related information. A variety of algorithms may be used, such as a geometric or arithmetic mean or median filter, among others. As will be appreciated, any noise removal technique may be used to remove noise from the unified reconstruction without departing from the spirit of this disclosure. Flow terminates at operation 314.

Figure 4:
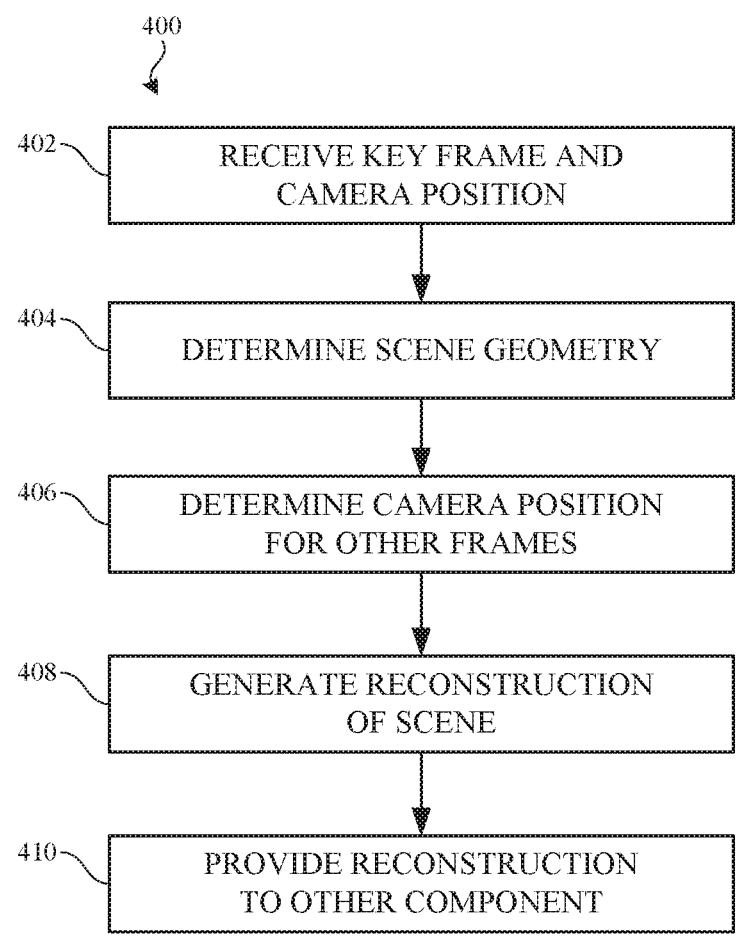
FIG. 4 illustrates an example method for generating a scene reconstruction based on a burst of image data associated with a key frame.

FIG. 4 illustrates an example method 400 for generating a scene reconstruction based on a burst of image data associated with a key frame. Method 400 may be performed by a computing device component such as burst processing component 110 of computing device 104 in FIG. 1. Method 400 begins at operation 402, where a key frame and image capture device position may be received. The key frame may have been identified from multiple frames of the burst of image data (e.g., using key frame determination component 106 in FIG. 1). The image capture device position may be the image capture device position for the key frame (which may have been determined by structure from motion component 108 in FIG. 1).

At operation 404, scene geometry may be determined by analyzing the key frame in relation to the other frames within the burst of image data. In an example, image features may be identified within the other frames based on the key frame. The image features may be compared or matched between the other frames and the key frame in order to identify anchor points that are associated with the features within the scene. In another example, anchor points may be identified based on comparing or matching colors, detected edges, or other attributes between the key frame and the other frames.

Moving to operation 406, the identified anchor points may be used in conjunction with the received image capture device position of the key frame in order to determine the image capture device position for each of the other frames within the burst of image data. In an example, the known position of the image capture device for the key frame may be adapted for each other frame in the burst of image data based on a comparison of the location of anchor points in the key frame versus the location of anchor points relating to the same image feature in the other frame. As a result, the image capture device position may be determined for the other frames of the burst of image data.

Flow progresses to operation 408, where a reconstruction of the scene may be generated. The reconstruction of the scene may be generated using structure from motion techniques as described herein, wherein geometry for the scene is determined from a variety of information, including, but not limited to, a comparison of common image features, anchor points within the frames, and the image capture device position for each of the frames in the burst of image data, or any combination thereof. The determined geometry may then be used to generate a reconstruction of the scene from the burst of image data. As an example, anchor points and image capture device positions may be compared between frames of the burst of image data, such that common image features may be matched and depth information may be determined. This information may then be used in order to project the image features into the reconstruction according to the determined depth information. At operation 410, the reconstruction is provided for further processing (e.g., to burst combination component 112 in FIG. 1 or operation 312 in FIG. 3). Flow terminates at operation 410.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of electronic device configurations that may be utilized for practicing aspects of the disclosure, as described herein.

Figure 5:
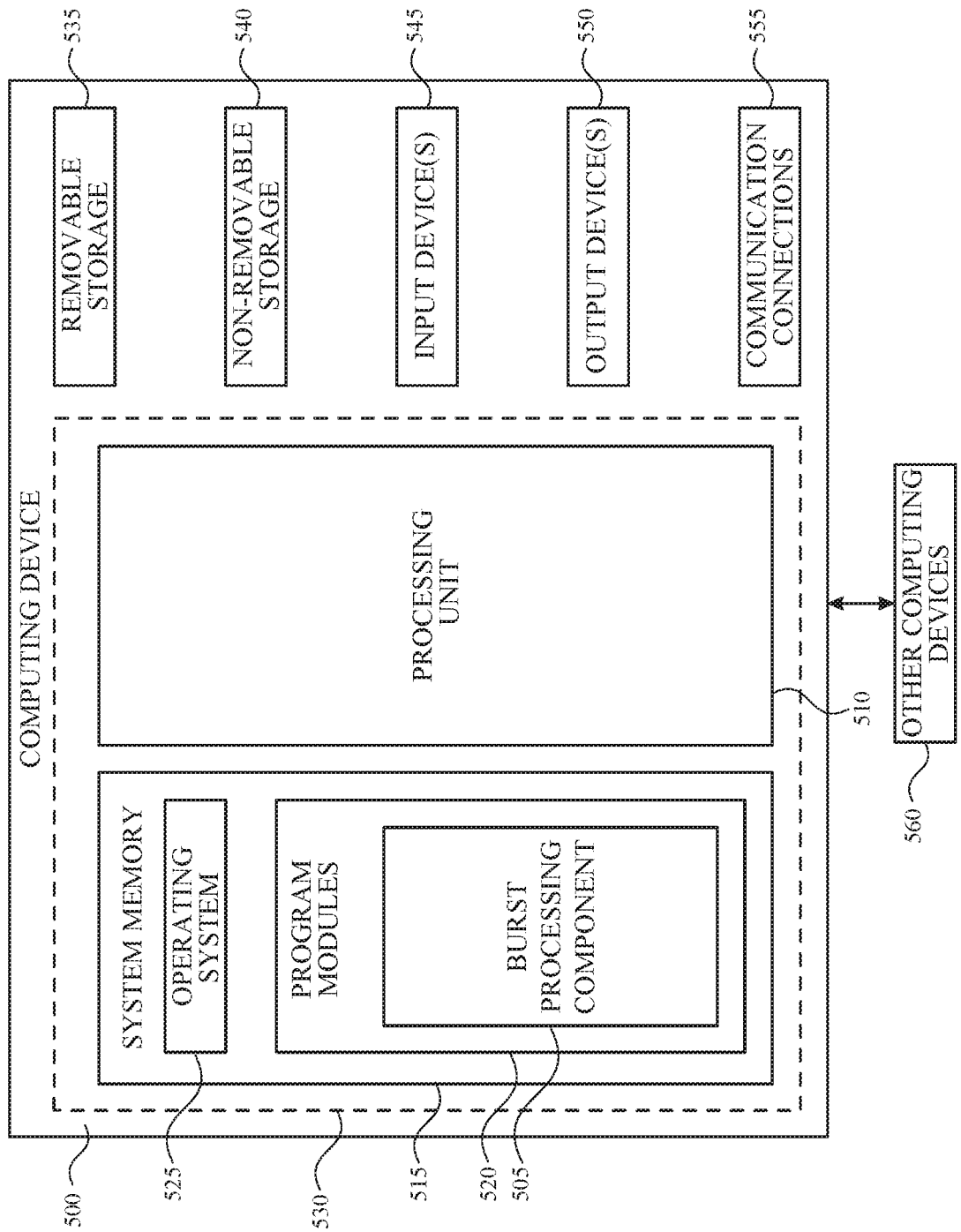
FIG. 5 is a block diagram illustrating example physical components of a computing device with which aspects of the disclosure may be practiced.

FIG. 5 is a block diagram illustrating physical components (e.g., hardware) of an electronic device 500 with which aspects of the disclosure may be practiced. The components of the electronic device 500 described below may have computer executable instructions for generating a mailto link in an electronic communication application such as described above.

In a basic configuration, the electronic device 500 may include at least one processing unit 510 and a system memory 515. Depending on the configuration and type of electronic device, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 suitable for parsing received responses, generating electronic messages, updating attendee lists and so on.

The operating system 525, for example, may be suitable for controlling the operation of the electronic device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 530.

The electronic device 500 may have additional features or functionality. For example, the electronic device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 (e.g., the burst processing component 505) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of the client to switch protocols may be operated via application-specific logic integrated with other components of the electronic device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electronic device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other electronic devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 500. Any such computer storage media may be part of the electronic device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
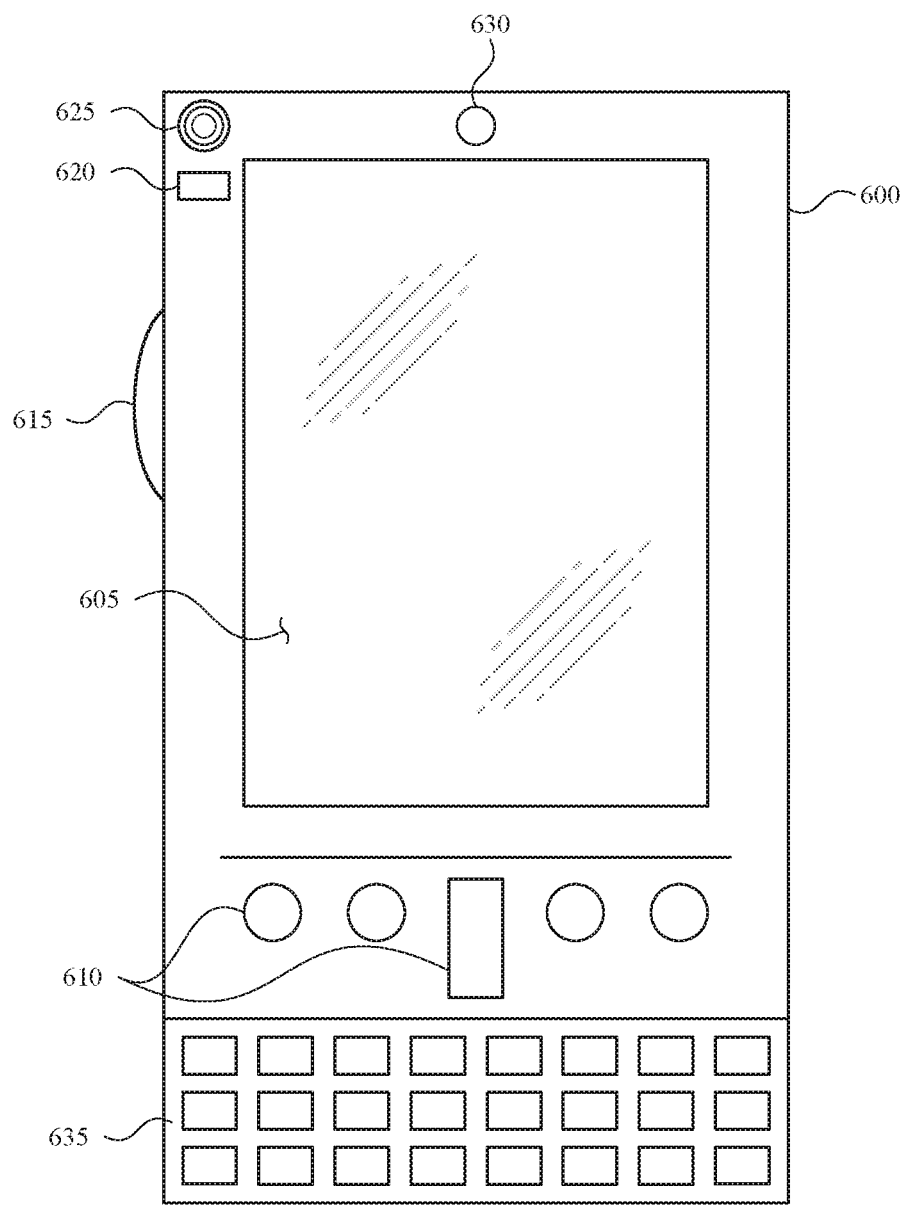
FIGS. 6A and 6B are simplified block diagrams of a mobile computing device with which aspects of the present disclosure may be practiced.
Figure 6B:
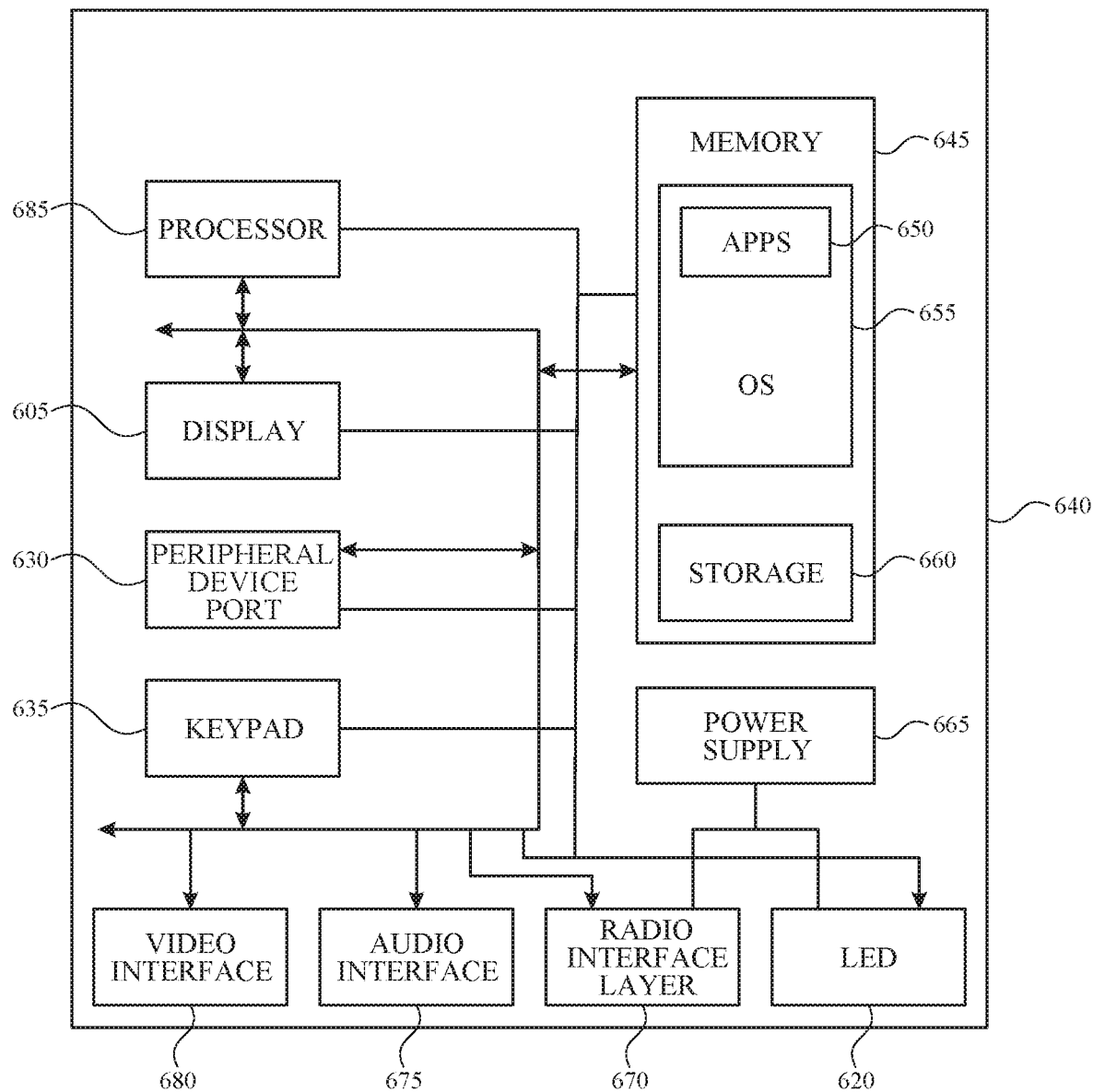

FIGS. 6A and 6B illustrate a mobile electronic device 600, for example, a mobile telephone, a smart phone, wearable computer (such as a smart watch), a tablet computer, a laptop computer, and the like, with which embodiments of the disclosure may be practiced. With reference to FIG. 6A, one aspect of a mobile electronic device 600 for implementing the aspects is illustrated.

In a basic configuration, the mobile electronic device 600 is a handheld computer having both input elements and output elements. The mobile electronic device 600 typically includes a display 605 and one or more input buttons 610 that allow the user to enter information into the mobile electronic device 600. The display 605 of the mobile electronic device 600 may also function as an input device (e.g., a display that accepts touch and/or force input).

If included, an optional side input element 615 allows further user input. The side input element 615 may be a rotary switch, a button, or any other type of manual input element. In alternative aspects, mobile electronic device 600 may incorporate more or less input elements. For example, the display 605 may not be a touch screen in some embodiments. In yet another alternative embodiment, the mobile electronic device 600 is a portable phone system, such as a cellular phone. The mobile electronic device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile electronic device 600 incorporates a vibration transducer for providing the user with tactile feedback. In yet another aspect, the mobile electronic device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile electronic device 600. That is, the mobile electronic device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area 660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the user takes action to indicate the powered-on status of the device.

The audio interface 675 is used to provide audible signals to and receive audible signals from the user (e.g., voice input such as described above). For example, in addition to being coupled to the audio transducer 625, the audio interface 675 may also be coupled to a microphone to receive audible input, such as to facilitate a telephone conversation. In accordance with embodiments of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like. The captured images may be provided to the artificial intelligence entity advertisement system such as described above.

A mobile electronic device 600 implementing the system 640 may have additional features or functionality. For example, the mobile electronic device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile electronic device 600 and stored via the system 640 may be stored locally on the mobile electronic device 600, as described above, or the data may be stored on any number of storage media that may be accessed by the device via the radio interface layer 670 or via a wired connection between the mobile electronic device 600 and a separate electronic device associated with the mobile electronic device 600, for example, a server computer in a distributed computing network, such as the Internet. As should be appreciated such data/information may be accessed via the mobile electronic device 600 via the radio interface layer 670 or via a distributed computing network. Similarly, such data/information may be readily transferred between electronic devices for storage and use according to well-known data/information transfer and storage means, including electronic mail and collaborative data/information sharing systems.

As should be appreciated, FIGS. 6A and 6B are described for purposes of illustrating the present methods and systems and is not intended to limit the disclosure to a particular sequence of steps or a particular combination of hardware or software components.

Figure 7:
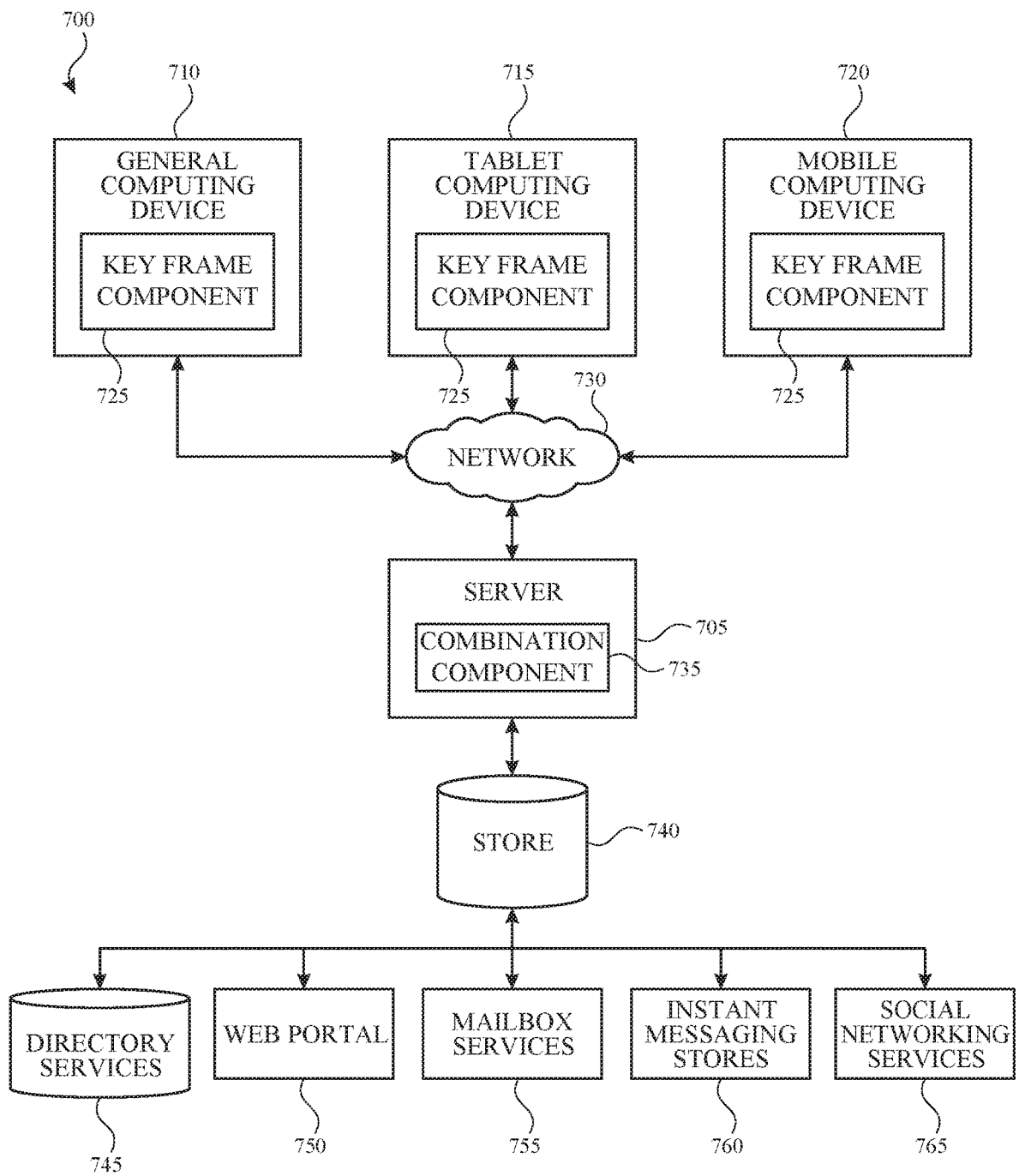
FIG. 7 is a simplified block diagram of a distributed computing system in which aspects of the present disclosure may be practiced.

FIG. 7 illustrates one aspect of the architecture of a system 700 in which aspects of the disclosure may be practiced. The system may include a general electronic device 710 (e.g., personal computer), tablet electronic device 715, or mobile electronic device 720, as described above. Each of these devices may include a key frame component 725 and/or a burst processing component such as described. The key frame component 725 may be configured to determine one or more key frames as described herein. Key frames (and, in some examples, burst processing information) may be transmitted to the combination component 735 which may provide, over the network 730, a scene reconstruction based on the provided information.

In some aspects, the combination component 735 may receive various types of information or content that is stored by the store 740 or transmitted from a directory service 745, a web portal 750, mailbox services 755, instant messaging stores 760, or social networking services 765.

By way of example, the aspects described above may be embodied in a general electronic device 710 (e.g., personal computer), a tablet electronic device 715 and/or a mobile electronic device 720 (e.g., a smart phone). Any of these embodiments of the electronic devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
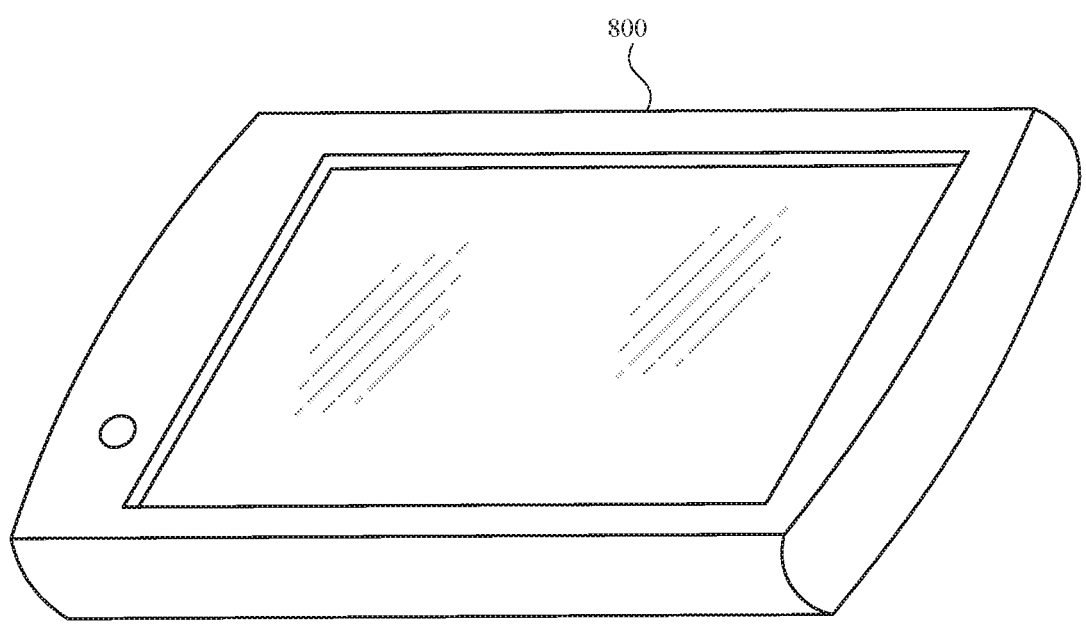
FIG. 8 illustrates a tablet computing device for executing one or more aspects of the present disclosure.

FIG. 8 illustrates an example tablet electronic device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices.

For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, FIG. 8 is described for purposes of illustrating the present methods and systems and is not intended to limit the disclosure to a particular sequence of steps or a particular combination of hardware or software components.

As will be understood from the foregoing disclosure, one aspect of the technology relates to a system comprising: at least one processor; and a memory storing instructions which, when executed by the at least one processor, performs a method for reconstructing a three-dimensional scene using data captured from an image capture device. The method comprises: receiving a plurality of bursts of image data captured by the image capture device relating to the three-dimensional scene; determining, for each burst of image data, a key frame associated with the burst of image data; determining, using the determined key frames, a position of the image capture device from which each key frame was captured; creating, for each burst of image data, a burst reconstruction of the three-dimensional scene using the burst of image data and the determined image capture device position for the key frame associated with the burst of image data; and generating, using the burst reconstructions, a unified reconstruction of the three-dimensional scene. In an example, determining a position of the image capture device comprises: identifying one or more common image features among a plurality of the determined key frames; identifying, using the one or more common image features, a plurality of anchor points within the plurality of the determined key frames; and determining, using the plurality of anchor points, an image capture device position for each of at least one of the plurality of determined key frames. In another example, creating a burst reconstruction comprises: identifying one or more common image features in one or more frames of the burst of image data and the key frame associated with the burst of image data; and determining, using the one or more common image features and the determined image capture device position for the key frame associated with the burst of image data, one or more positions of the image capture device from which the one or more frames were captured. In a further example, determining a key frame comprises randomly identifying a key frame for a burst of image data. In yet another example, determining a key frame comprises selecting a key frame for a burst of image data based on at least one of accelerometer data and metadata. In a further still example, a burst of image data comprises at least one of one or more frames of image data relating to the three-dimensional scene and one or more frames of video data relating to the three-dimensional scene. In another example, the system further comprises instructions for: processing the unified construction to remove noise.

In another aspect, the technology relates to a computer-implemented method for reconstructing a three-dimensional scene using data captured from an image capture device. The method comprises: receiving a plurality of bursts of image data captured by the image capture device relating to the three-dimensional scene; determining, for each burst of image data, a key frame associated with the burst of image data; determining, using the determined key frames, a position of the image capture device from which each key frame was captured; creating, for each burst of image data, a burst reconstruction of the three-dimensional scene using the burst of image data and the determined image capture device position for the key frame associated with the burst of image data; and generating, using the burst reconstructions, a unified reconstruction of the three-dimensional scene. In an example, determining a position of the image capture device comprises: identifying one or more common image features among a plurality of the determined key frames; identifying, using the one or more common image features, a plurality of anchor points within the plurality of the determined key frames; and determining, using the plurality of anchor points, an image capture device position for each of at least one of the plurality of determined key frames. In another example, creating a burst reconstruction comprises: identifying one or more common image features in one or more frames of the burst of image data and the key frame associated with the burst of image data; and determining, using the one or more common image features and the determined image capture device position for the key frame associated with the burst of image data, one or more positions of the image capture device from which the one or more frames were captured. In a further example, determining a key frame comprises randomly identifying a key frame for a burst of image data. In yet another example, determining a key frame comprises selecting a key frame for a burst of image data based on at least one of accelerometer data and metadata. In a further still example, a burst of image data comprises at least one of one or more frames of image data relating to the three-dimensional scene and one or more frames of video data relating to the three-dimensional scene.

In another aspect, the technology relates to another computer-implemented method for reconstructing a three-dimensional scene using data captured from an image capture device. The method comprises: selecting, for each burst of image data of a plurality of bursts of image data, a key frame from the burst of image data; determining, using the selected key frames, a position of the image capture device for each key frame from which the three-dimensional scene was observed; creating, for each burst of image data, a burst reconstruction of the three-dimensional scene using the burst of image data and the determined image capture device position for the key frame selected for the burst of image data; generating, using the burst reconstructions, a unified reconstruction of the three-dimensional scene; and processing the unified construction to remove noise. In an example, determining a position of the image capture device comprises: identifying one or more common image features among a plurality of the selected key frames; identifying, using the one or more common image features, a plurality of anchor points within the plurality of the selected key frames; and determining, using the plurality of anchor points, an image capture device position for each of at least one of the plurality of selected key frames. In another example, creating a burst reconstruction comprises: identifying one or more common image features in one or more frames of the burst of image data and the key frame selected for the burst of image data; and determining, using the one or more common image features and the determined image capture device position for the key frame selected for the burst of image data, one or more positions of the image capture device from which the one or more frames were captured. In a further example, selecting a key frame comprises randomly identifying a key frame for a burst of image data. In yet another example, selecting a key frame comprises selecting a key frame for a burst of image data based on at least one of accelerometer data and metadata. In a further still example, a burst of image data comprises multiple frames of image data relating to the three-dimensional scene. In another example, a burst of image data comprises multiple frames of video data relating to the three-dimensional scene.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory storing instructions which, when executed by the at least one processor, performs a set of operations for reconstructing a three-dimensional scene using data captured from an image capture device, the set of operations comprising:
   receiving sets of multiple images captured by the image capture device relating to the three-dimensional scene, wherein each set of multiple images is captured from a different position in the three-dimensional scene;
   for each set from the sets of multiple images:
   determining a position of the image capture device from which a key frame of the set was captured;
   determining a position of the image capture device for each image of the set based on the position of the image capture device from which the key frame was captured; and
   creating, for the set, a scene reconstruction of the three-dimensional scene based on the determined image capture device positions for each image of the set; and
   generating, using the scene reconstructions for the sets of multiple images, a unified reconstruction of the three-dimensional scene.

2. The system of claim 1, wherein determining a position of the image capture device from which a key frame of each set from the sets of multiple images was captured comprises:
   identifying one or more common image features among a plurality of the key frames for the sets of multiple images;
   identifying, using the one or more common image features, a plurality of anchor points within the plurality of the key frames; and
   determining, using the plurality of anchor points, the position of the image capture device from which the key frame was captured.

3. The system of claim 1, wherein determining a position of the image capture device for each image of a set of multiple images comprises:
   identifying one or more common image features between said image and the key frame associated with the set of multiple images.

4. The system of claim 1, wherein a key frame for each set is determined by randomly identifying a key frame for a set of multiple images.

5. The system of claim 1, wherein a key frame for each set is selected based on at least one of accelerometer data and metadata.

6. The system of claim 1, wherein at least one set of multiple images of the sets of multiple images is generated from video data relating to the three-dimensional scene.

7. The system of claim 1, wherein the set of operations further comprises:
   processing the unified construction to remove noise.

8. A computer-implemented method for reconstructing a three-dimensional scene using data captured from an image capture device, comprising:
   receiving sets of multiple images captured by the image capture device relating to the three-dimensional scene, wherein each set of multiple images is captured from a different position in the three-dimensional scene;

for each set from the sets of multiple images:
  determining a position of the image capture device from which a key frame of the set was captured;
  determining a position of the image capture device for each image of the set based on the position of the image capture device from which the key frame was captured; and
  creating, for the set, a scene reconstruction of the three-dimensional scene based on the determined image capture device positions for each image of the set; and
generating, using the scene reconstructions for the sets of multiple images, a unified reconstruction of the three-dimensional scene.

9. The computer-implemented method of claim 8, wherein determining a position of the image capture device from which a key frame of each set from the sets of multiple images was captured comprises:
  identifying one or more common image features among a plurality of the key frames for the sets of multiple images;
  identifying, using the one or more common image features, a plurality of anchor points within the plurality of the key frames; and
  determining, using the plurality of anchor points, the position of the image capture device from which the key frame was captured.

10. The computer-implemented method of claim 8, wherein determining a position of the image capture device for each image of the set of multiple images comprises:
  identifying one or more common image features between said image and the key frame associated with the set of multiple images.

11. The computer-implemented method of claim 8, wherein a key frame for each set is determined by randomly identifying a key frame for a set of multiple images.

12. The computer-implemented method of claim 8, wherein a key frame for each set is selected based on at least one of accelerometer data and metadata.

13. The computer-implemented method of claim 8, wherein at least one set of multiple images of the sets of multiple images is generated from video data relating to the three-dimensional scene.

14. A computer-implemented method for reconstructing a three-dimensional scene using data captured from an image capture device, comprising:
  selecting, for each set of multiple images of a plurality of sets of multiple images, a key frame from the set of multiple images, wherein each set of multiple images:
    is captured from a different perspective of the three-dimensional scene; and
    wherein each image of the multiple images is captured from a different position for the different perspective of the three-dimensional scene as compared to other images of the multiple images;
  determining, using the selected key frames, a position of the image capture device for each key frame from which the three-dimensional scene was observed;
  determining, for each image of each set, a position of the image capture device from which the image was captured based on the determined position of the image capture device from which the key frame of the set was captured;
  creating, for each set of multiple images, a scene reconstruction of the three-dimensional scene based on the determined image capture device positions for images of the set;
  generating, using the scene reconstructions, a unified reconstruction of the three-dimensional scene; and
  processing the unified construction to remove noise.

15. The computer-implemented method of claim 14, wherein determining a position of the image capture device for each key frame comprises:
  identifying one or more common image features among a plurality of the selected key frames;
  identifying, using the one or more common image features, a plurality of anchor points within the plurality of the selected key frames; and
  determining, using the plurality of anchor points, a position of the image capture device for each key frame from which the three-dimensional scene was observed.

16. The computer-implemented method of claim 14, wherein determining a position of the image capture device for each image of a set of multiple images comprises:
  identifying one or more common image features between said image and the key frame selected for the set of multiple images.

17. The computer-implemented method of claim 14, wherein selecting a key frame for a set of multiple images comprises randomly identifying the key frame in the set of multiple images.

18. The computer-implemented method of claim 14, wherein selecting a key frame for a set of multiple images comprises selecting the key frame in the set of multiple images based on at least one of accelerometer data and metadata.

19. The computer-implemented method of claim 14, wherein a first set of multiple images comprises multiple frames of image data relating to the three-dimensional scene.

20. The computer-implemented method of claim 19, wherein a second set of multiple images comprises multiple frames of video data relating to the three-dimensional scene.

* * * * *